United States Patent
PrasannaKumar et al.

(10) Patent No.: US 10,769,649 B1
(45) Date of Patent: Sep. 8, 2020

(54) AUTOMATED CENTRALIZED REAL-TIME MULTI-CHANNEL FEEDBACK SYSTEM

(71) Applicant: EMC Corporation, Hopkinton, MA (US)

(72) Inventors: Darshan PrasannaKumar, Bangalore (IN); Vindhya Shanmugam, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 860 days.

(21) Appl. No.: 14/582,334

(22) Filed: Dec. 24, 2014

(51) Int. Cl.
*G06Q 30/02* (2012.01)

(52) U.S. Cl.
CPC ......... *G06Q 30/0203* (2013.01); *G06Q 30/02* (2013.01)

(58) Field of Classification Search
CPC ............... G06Q 30/0203; G06Q 30/02; G06Q 30/0201; G06F 3/048
USPC ................................................ 705/7.32, 7.29
See application file for complete search history.

(56) References Cited

U.S. PATENT DOCUMENTS

| | | | | |
|---|---|---|---|---|
| 5,822,410 A * | 10/1998 | McCausland | ......... | H04M 15/00 379/114.01 |
| 8,266,148 B2 * | 9/2012 | Guha | ................ | G06F 17/30867 707/737 |
| 8,401,893 B1 * | 3/2013 | Heuler | ................... | G06Q 10/10 705/7.36 |
| 8,655,938 B1 * | 2/2014 | Smith | ................. | G06F 17/3053 706/45 |
| 9,916,538 B2 * | 3/2018 | Zadeh | .................... | G06N 7/005 |
| 2001/0031454 A1 * | 10/2001 | Mintz | ................. | G06Q 10/107 434/322 |
| 2002/0188777 A1 * | 12/2002 | Kraft | ..................... | G06Q 10/10 710/100 |
| 2003/0088452 A1 * | 5/2003 | Kelly | .................... | G06Q 30/02 705/7.32 |

(Continued)

OTHER PUBLICATIONS

Mining Customer Feedbacks for Actionable Intelligence, Lipika Dey, Sk Mirajul Haque, Nidhi Raj, 2010 IEEE/WIC/ACM International Conference on on Web Intelligence and Intelligent Agent Technology, pp. 239-242 (Year: 2010).*

(Continued)

*Primary Examiner* — Timothy Padot
*Assistant Examiner* — Darlene Garcia-Guerra
(74) *Attorney, Agent, or Firm* — Ryan, Mason & Lewis, LLP

(57) ABSTRACT

Techniques for providing real-time multi-channel feedback. For example, a system comprises a platform including a feedback management component comprising an analytics engine capable of analyzing feedback from a plurality of users, wherein the analyzing comprises gathering data from the plurality of users, processing the data to derive at least one trend from the data, and formatting a presentation of the data to enumerate the at least one trend. The system further comprises a portal component capable of transmitting the feedback, including results of the analyzing comprising the presentation of the data, to at least one of a business unit and an experiential unit in real-time, and a channel management component capable of managing the feedback from each of a plurality of interfaces through which the plurality of users provide the data.

20 Claims, 3 Drawing Sheets

(56) References Cited

U.S. PATENT DOCUMENTS

| | | | | |
|---|---|---|---|---|
| 2004/0128183 A1* | 7/2004 | Challey | ............... | G06Q 30/0203 705/7.32 |
| 2004/0143477 A1* | 7/2004 | Wolff | ............... | G06Q 10/06316 705/7.26 |
| 2005/0256727 A1* | 11/2005 | Bennett | ............... | G06Q 30/0203 705/7.32 |
| 2006/0053058 A1* | 3/2006 | Hotchkiss | ............... | G06Q 30/02 705/14.13 |
| 2007/0156673 A1* | 7/2007 | Maga | ............... | G06Q 30/02 |
| 2007/0192166 A1* | 8/2007 | Van Luchene | ......... | G06Q 30/02 705/14.54 |
| 2007/0294098 A1* | 12/2007 | Tietjen | ............... | G06Q 10/10 705/325 |
| 2008/0183519 A1* | 7/2008 | King | ............... | G06Q 40/12 705/30 |
| 2010/0250339 A1* | 9/2010 | Villarreal | ............ | G06Q 10/0637 705/7.36 |
| 2011/0054968 A1* | 3/2011 | Galaviz | ............... | G06Q 10/06 705/7.28 |
| 2011/0231226 A1* | 9/2011 | Golden | ............... | G06Q 20/10 705/7.32 |
| 2011/0276513 A1* | 11/2011 | Erhart | ............... | G06Q 30/02 705/347 |
| 2012/0130934 A1* | 5/2012 | Brillhart | ............ | G06Q 30/0203 706/46 |
| 2013/0080348 A1* | 3/2013 | Pantaliano | ............ | G06Q 30/02 705/347 |
| 2013/0159329 A1* | 6/2013 | Greenberg | ............ | G06Q 10/063 707/756 |
| 2013/0191299 A1* | 7/2013 | Hermsdorff | ........ | G06Q 10/1053 705/321 |
| 2013/0218634 A1* | 8/2013 | Hills | ............... | G06Q 30/0201 705/7.29 |
| 2013/0218637 A1* | 8/2013 | Bikman | ............... | G06Q 30/0201 705/7.32 |
| 2014/0040161 A1* | 2/2014 | Berlin | ............... | G06Q 30/0282 705/347 |
| 2014/0040301 A1* | 2/2014 | Chadha | ............... | G06F 17/2785 707/765 |
| 2014/0143017 A1* | 5/2014 | Kannan | ............... | G06Q 30/0203 705/7.32 |
| 2014/0143157 A1* | 5/2014 | Jeffs | ............... | G06Q 30/016 705/304 |
| 2014/0156349 A1* | 6/2014 | McLoughlin | ...... | G06Q 30/0203 705/7.32 |
| 2014/0236875 A1* | 8/2014 | Phillipps | ............ | G06Q 30/0202 706/12 |
| 2014/0298260 A1* | 10/2014 | Abowd | ............... | G06F 3/04842 715/810 |
| 2014/0324517 A1* | 10/2014 | Harris | ............... | G06Q 10/0633 705/7.27 |
| 2014/0337072 A1* | 11/2014 | Tamblyn | .......... | G06Q 10/06311 705/7.13 |
| 2015/0039297 A1* | 2/2015 | Greer | ................. | G06F 17/2785 704/9 |
| 2015/0229645 A1* | 8/2015 | Keith | ................. | H04L 41/50 726/4 |
| 2015/0310445 A1* | 10/2015 | Chan | ................ | G06Q 10/06316 705/7.26 |

OTHER PUBLICATIONS

Opinion mining of customer feedback data on the web, Lee et al., Publication: ICUIMC '08: Proceedings of the 2nd international conference on Ubiquitous information management and communication, Jan. 2008, pp. 230-235 (Year: 2008).*

Pivotal, "Pivotal HD: Maximize Business Value from All your Data," http://www.pivotal.io/big-data/pivotal-hd, retrieved Dec. 2, 2014, 11 pages.

EMC Corporation, "EMC Introduces World's Most Powerful Hadoop Distribution: Pivotal HD," http://www.emc.com/about/news/press/2013/20130225-04-htm, Feb. 25, 2013, 3 pages (retrieved Dec. 2, 2014).

EMC Corporation, "EMC Total Customer and Partner Experience Program," http://www.emc.com/campaign/tce/index.htm, retrieved Dec. 2, 2014, 3 pages.

J. Lewis et al., "Microservices," http://martinfowler.com/articles/microservices.html, Mar. 25, 2014, 16 pages (retrieved Dec. 2, 2014).

wikipedia.com, "Real-Time Computing," http://en.wikipedia.org/wiki/Real-time_computing, Nov. 19, 2014, 15 pages, (retrieved Dec. 3, 2014).

cloudfoundry.org, "About Cloud Foundry Community," http://www.cloudfoundry.org/about/index.html, retrieved Dec. 2, 2014, 5 pages.

* cited by examiner

100

AUTOMATED CENTRALIZED REAL-TIME MULTI-CHANNEL FEEDBACK SYSTEM

FIELD

The field relates generally to feedback systems, and more particularly to an automated centralized real-time multi-channel feedback system.

BACKGROUND

In general, business entities rely on feedback from their customers in order to improve their products and/or services or modify their offerings to suit the needs of their customers. Known methods of providing and responding to feedback include, for example, manually responding to customer inquiries and/or comments via a medium such as, for example, telephone, letters or e-mail. These manual methods are often time consuming and effort driven. In addition, with known methods of providing and responding to feedback, there is a probability of data being lost and of losing feedback actions, and there are limited channels for receiving feedback in, for example, a digital environment.

As a result, business entities are often unable to adequately derive customer insights. Accordingly, there is a need for an improved feedback system so that businesses may adequately engage customers to improve their connections with customers, resulting in an overall better customer experience and connection between supplier and customer.

SUMMARY

Embodiments of the invention provide techniques for providing a single integrated feedback system for customers, wherein the feedback system is automated and operates in real-time over multiple channels.

For example, in one embodiment, a system comprises a memory and a processor operatively coupled to the memory configured to execute a platform comprising a feedback management component comprising an analytics engine capable of analyzing feedback from a plurality of users, wherein the analyzing comprises gathering data from the plurality of users, processing the data to derive at least one trend from the data, and formatting a presentation of the data to enumerate the at least one trend, a portal component capable of transmitting the feedback, including results of the analyzing comprising the presentation of the data, to at least one of a business unit and an experiential unit in real-time, and a channel management component capable of managing the feedback from each of a plurality of interfaces through which the plurality of users provide the data.

In another embodiment, a method comprises implementing a platform, and configuring the platform to analyze feedback from a plurality of users, wherein the analyzing comprises gathering data from the plurality of users, processing the data to derive at least one trend from the data, and formatting a presentation of the data to enumerate the at least one trend, transmit the feedback, including results of the analyzing comprising the presentation of the data, to at least one of a business unit and an experiential unit in real-time, and manage the feedback from each of a plurality of interfaces through which the plurality of users provide the data.

In another embodiment, an article of manufacture is provided which comprises a processor-readable storage medium having encoded therein executable code of one or more software programs. The one or more software programs when executed by a processing device implement steps of the above-described method.

In yet another embodiment, a method comprises analyzing feedback from a plurality of users, wherein the analyzing comprises gathering data from the plurality of users, processing the data to derive at least one trend from the data, and formatting a presentation of the data to enumerate the at least one trend, transmitting the feedback, including results of the analyzing comprising the presentation of the data, to at least one of a business unit and an experiential unit in real-time, and managing the feedback from each of a plurality of interfaces through which the plurality of users provide the data.

Advantageously, the embodiments of the invention provide systems and methods for real-time multi-channel feedback, so that customers can be engaged in real-time, from multiple locations and via multiple devices. Embodiments of the invention, for example, eliminate a need for manual effort, improve productivity by automation, and derive improved customer insights through analytics. Embodiments provide businesses with plans for product roadmaps, real-time feedback, online dashboards for measurements, and the ability to better know their customers. Embodiments provide customers with an improved customer experience, and the ability to remain connected to their suppliers in real-time.

These and other features and advantages of the invention will become more readily apparent from the accompanying drawings and the following detailed description.

DETAILED DESCRIPTION

Embodiments of the invention will be described herein with reference to an exemplary real-time multi-channel feedback system and associated servers, computers, storage units and devices and other processing devices. It is to be appreciated, however, that embodiments of the invention are not restricted to use with the particular illustrative system and device configurations shown. Moreover, the phrase "real-time multi-channel feedback system" as used herein is intended to be broadly construed, so as to encompass, for example, private or public cloud computing or storage systems, as well as other types of systems comprising distributed physical and virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

As used herein, the term "real-time" refers to programs that guarantee responses within strict time constraints. Real-time responses can be understood to be instantaneous or in the order of milliseconds or microseconds. A system without real-time facilities cannot guarantee a response within any timeframe. A real-time system is able to control an environment by receiving data, processing the data, and returning the results sufficiently quickly to affect the environment at that time. For example, in connection with running a survey, gathering responses and coming to meaningful insights, in accordance with an embodiment of the invention, the use of the term real-time is to indicate that running surveys, gathering feedback and analyzing responses is performed to affect an environment at that time, and their performance may be, for example, instantaneous or in the order of milliseconds or microseconds. Of course, it should be understood that depending on the particular temporal nature of the system in which an embodiment of the invention is implemented, other appropriate timescales that provide at least contemporaneous performance and response can be achieved.

Figure 1:
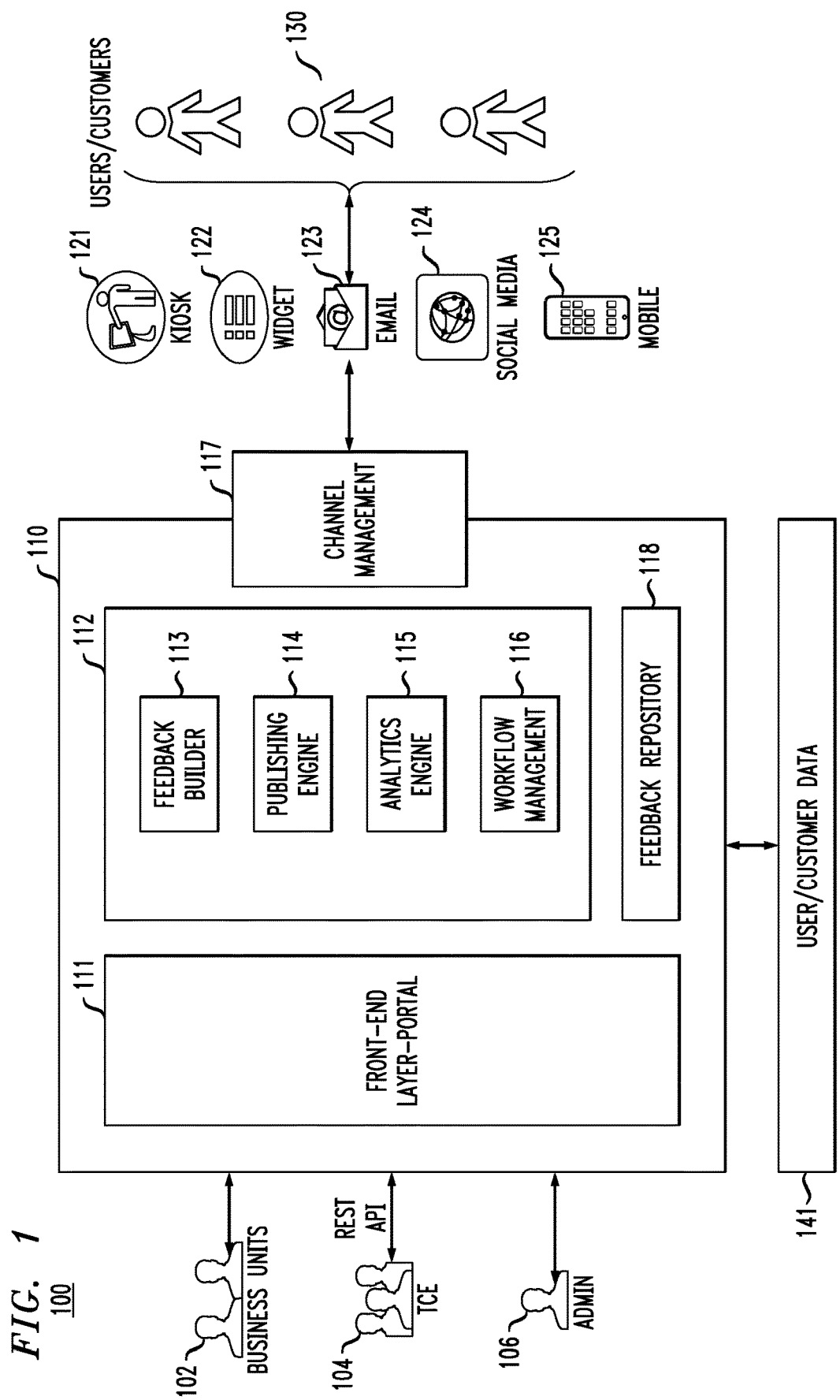
FIG. 1 is a block diagram illustrating an environment including a real-time multi-channel feedback system, according to an embodiment of the invention.

FIG. 1 is a block diagram illustrating an environment 100 including a real-time multi-channel feedback system 110, according to an exemplary embodiment of the invention. The multi-channel feedback system 110 includes a platform comprising a portal component 111, a feedback management component 112, a channel management component 117 and a feedback repository 118.

The feedback management component 112 comprises an analytics engine 115, which is configured to analyze feedback from one or more users 130 (e.g., customers). The analytics engine 115 may be configured to perform big data analytics, and can include, for example, PIVOTAL® HD structured query language (SQL) engine, available from Pivotal Software, Inc. of Palo Alto, Calif.

The portal component 111 is configured to transmit the feedback, including results of the analyzing, to at least one of a business unit 102 and an experiential unit 104 in real-time. The experiential unit 104, for example, a total customer experience (TCE) unit, can be a group of people and/or computer system within in an organization committed to exceeding customer and partner expectations as customers and partners engage and evolve with the organization. An experiential unit 104 endeavors to understand and respond to customer experiences in areas that are deemed to matter most to the customers. The portal component 111 is further configured to provide at least one dashboard based on the results of the analyzing to at least one of a business unit 102 and an experiential unit 104. There may be multiple business and experiential units 102, 104. A business unit 102 can be a unit of a company which represents a business function. Business units, for example, could be product groups who are interested in the feedback received for their respective products.

The portal component 111 is also configured to receive instructions from an administrative component 106 outlining access to the feedback system 110 for at least one of the business unit 102, the experiential unit 104 and the one or more users 130. The administrative component 106 refers to a component through which the functioning of the portal component 111 and the system 110 can be controlled. For example, the administrative component 106 can control access to the portal component 111, configure capabilities of the portal that a user can access, configure approvers, etc. The portal component 111 can include, for example, BOOT-STRAP™ open source Hypertext Markup Language (HTML), Cascading Styles Sheets (CSS), and JavaScript (JS) framework, and jQuery® JavaScript library software, available from jQuery Foundation, Inc. of Walnut, Calif., and can use CSS 3 and HTML 5 techniques. The business unit 102, experiential unit 104 and administrative component 106 can interface with the portal component 111 using, for example, a representational state transfer (REST) application programming interface (API).

The channel management component 117 is configured to manage the feedback from each of a plurality of interfaces, including, but not limited to, a kiosk device 121, a widget 122 on a graphical user interface (GUI), an e-mail application 123, a social media application 124, a mobile device 125 and a desktop URL. The widget 122 can be, for example, part of a user interface provided by a product offered to a customer. A customer can, via the widget 122, proactively provide feedback on the product while using the product. The widget 122 can be used as an alternative to a survey discussed below. The widget 122 can also be used to provide survey responses.

The feedback can comprise a response to a survey, and the analytics engine 115 is configured to analyze survey results and the success of the survey. In accordance with an embodiment, the survey is created by a business unit 102 or an experiential unit 104, and submitted to the system 110 via the portal component 111. The feedback management component 112 includes a workflow management engine 116 configured to implement a workflow to obtain approval for questions in the survey. Depending on particular arrangements in place, an experiential unit 104 or a business unit 104 may approve questions for a survey. Different user groups can be involved in authoring, reviewing and approving survey questions. Having a workflow in place allows for efficient management of the approval process. In accordance with different embodiments, certain users will author a survey, while others will approve or reject a survey. After approval, a survey can be published to one or more users 130. The feedback management component 112 further includes a publishing engine 114 configured to publish the survey to the one or more users 130.

In accordance with an embodiment of the invention, a workflow provides an opportunity for a business unit 102 or an experiential unit 104 to review and approve questions before they get published. All of the approved questions can then be available in a knowledge base, such as, for example, feedback builder 113, and can be made part of any survey. The feedback builder 113 includes a repository of questions stored therein. When it is decided that a survey is to be carried out, questions can be obtained from the feedback builder 113 based on a variety of factors, including, but not limited to, the service offering, product line, target customer base, survey mechanism/structure, etc. The feedback builder 113 is configured to automate the process of choosing relevant survey questions from a repository based on input describing the factors provided by a business or experiential unit 102, 104, thereby ensuring that the most apt questions are chosen, rather than having a generic set of questions pushed across to the users 130. The feedback builder 113 is configured to compare such inputted factors as the service offering, product line, target customer base, survey mechanism, etc. to questions in the repository to determine appropriate questions for a survey. According to an embodiment, the feedback builder 113 includes a learning algorithm and is capable of being trained as to which questions are appropriate for given factors based on acceptance or rejection of survey questions. The feedback builder 113, publishing engine 114 and workflow management engine 116 can include, for example, the SPRING® platform providing domain-specific execution environments for a variety of enterprise workloads, available from Pivotal Software, Inc. of Palo Alto, Calif.

When a business or experiential unit 102, 104 decides to run a survey, as part of setting up the survey, the business or experiential unit 102, 104 may determine the interface on which the survey is to be run (e.g., one of the interfaces 121-125). Based on the chosen interface, feedback builder 113 can be configured to automatically design the structure of the survey. For example, depending on the interface, it may be appropriate for the survey to be in the form of structured questions and answers, or in the form of free flowing text. The feedback builder 113 is also configured to vary the look and feel of a survey based on the interface. Once survey responses are received, the channel management component 117 is configured to translate the received data to a structured form to enable analytics to be run on the data set, irrespective of the channel through which the feedback was collected.

In accordance with an embodiment of the invention, the business and/or experiential units 102, 104 can, via the portal and channel management components 111, 117, push a survey across to the users 130 through the various interfaces 121-125. The users 130 can also, through the various interfaces 121-125 or by visiting a designated portal of the feedback system 110, provide feedback on services and products offered by an organization.

The analytics engine 115 is configured to receive feedback data via the channel management component 117 and analyze the feedback data collected from the plurality of interfaces 121-125. As a result the analytics engine 115 can derive meaningful insights from the feedback data. For example, the analytics engine 115 can carry out sentiment analysis on the feedback data, including, for example, survey results and/or direct input (e.g., via widget 122), to deduce customer opinions on services and products. The analytics engine 115 may also perform sentiment analysis in connection with streaming input from social media applications 124. In addition, the analytics engine 115 is configured to analyze the success of a survey, by determining, for example, response rates or improvements in response rates, and the survey's ability to trigger process improvements, and influence product roadmaps.

The analytics engine 115 is configured to harness and derive insights from the feedback data, which may be in the form of big data, and can use SQL to increase the speed at which data analysis is performed. For example, the analytics engine 115 may be equipped to perform parallel SQL processing, running analytical queries and mixed query workloads in parallel environments. The analytics engine 115 can also be equipped for linear scalability, direct writing to a big data store, and back-end analytics.

The business and experiential units 102, 104 can derive insights from feedback, such as survey responses and direct input, which provide pointers to improve, for example, processes and service offerings of an entity. The feedback system 110 can be configured to record, for example, as a case, the derived insights and actions taken as a result of the derived insights. The feedback system 110 can be configured to track actions taken as a result of the derived insights to closure, by, for example, measuring if the actions taken have addressed the shortcomings or concerns noted by the one or more users 130. Such tracking and measuring can be performed in real-time. In accordance with another embodiment, the feedback system 110 can be integrated with a case management system, on which the derived insights and actions taken as a result of the derived insights can be recorded and tracked to closure.

The portal component 111 can be used to receive the derived insights, and actions to be taken as a result of the derived insights, from the business and/or experiential units 102, 104. Further, the portal component 111 can be used to transmit results of the actions taken back to the business and experiential units 102, 104. The channel management component 117 can be used to transmit the actions to be taken and results of the actions taken between the feedback system 110 and the users 130. The reception and transmission of the insights, actions and results can be performed in real-time.

As noted above, in accordance with an embodiment, the portal component 111 is configured to provide at least one dashboard based on the results of the analyzing to business and/or experiential units 102, 104. A dashboard can include integrated insights based on feedback collected across multiple channels. In a non-limiting example, a dashboard may include trend analysis of customer behavior, responses, requests, etc. over a certain time period, such as over past years, quarters, etc. The dashboard can provide instant views of the trend analysis, providing views of live and historical information. Such a dashboard can be provided to the business and/or experiential units 102, 104 in real-time.

According to an embodiment of the invention, the portal component 111 is configured to receive from at least one of a business unit 102 and an experiential unit 104, a real-time response to the feedback to be transmitted via the channel management component 117 and one or more of the interfaces 121-125 to the one or more users 130.

The platform of the multi-channel feedback system 110 further comprises a feedback repository 118 configured to store at least one of the feedback from one or more users 130 and the results of the analyzing. The feedback repository 118 can include, for example, the PostgreSQL™ open source object-relational database system, available from the PostgreSQL Global Development Group.

A user/customer database 141 can provide to the feedback system 110 details about the users (e.g., customers) and their product landscape, which can be used by the feedback builder 113 when choosing relevant questions for a survey, and/or by the analytics engine 115 when analyzing feedback data as discussed above.

The components of the multi-channel feedback system 110, including, for example, the portal, feedback management and channel management components 111, 112 and 117, as well as the feedback repository 118, may comprise software products including one or more application programs running on a virtualization infrastructure, a cloud infrastructure and/or a micro services architecture.

Figure 2:
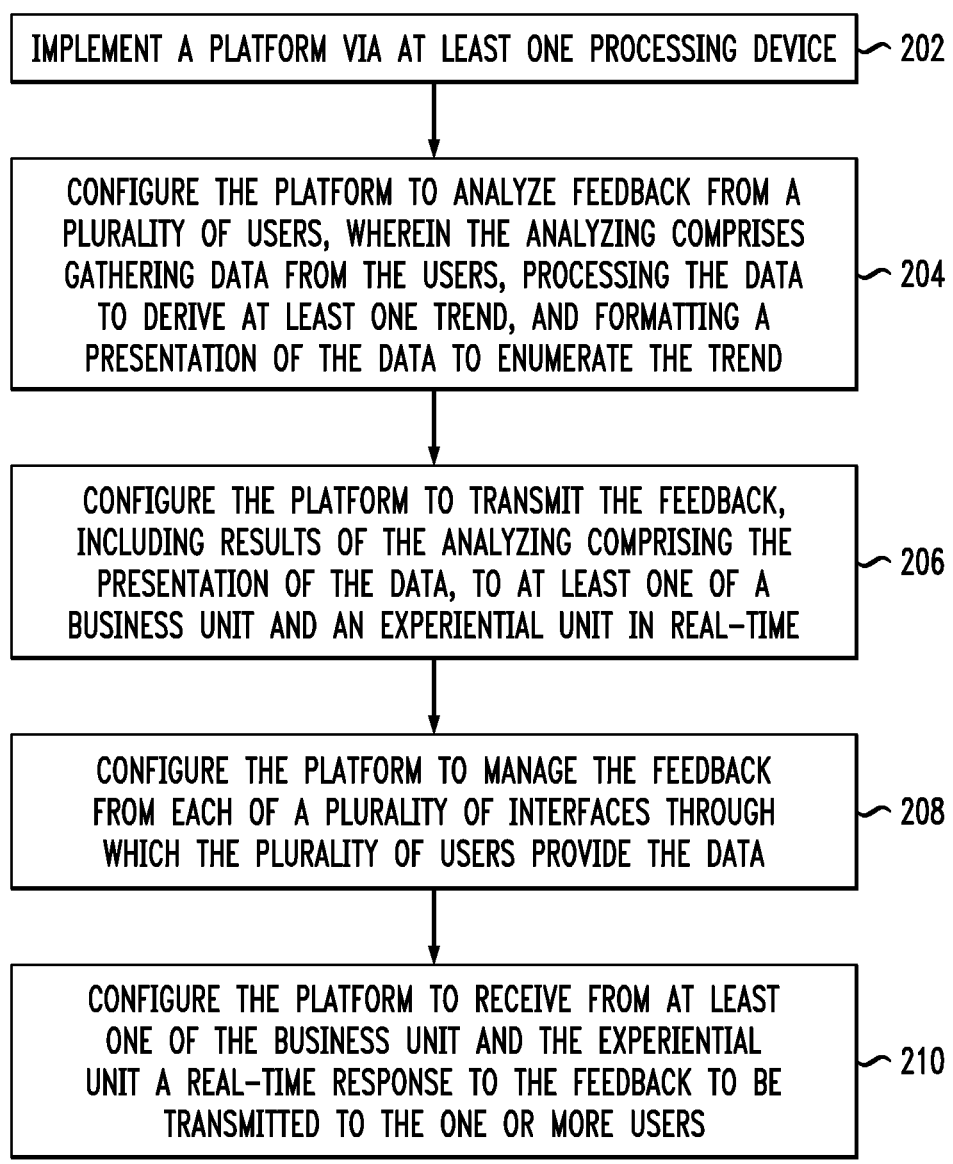
FIG. 2 is a flow chart showing a method for implementing real-time multi-channel feedback, in accordance with an embodiment of the present invention.

FIG. 2 is a flow chart showing a method for implementing real-time multi-channel feedback, in accordance with an embodiment of the present invention. Unless otherwise stated, the order or number of steps set forth in FIG. 2 is not necessarily limited to what is shown, and may be subject to change. It should be understood that the structure of the flow chart set forth in FIG. 2 be viewed as exemplary rather than as a requirement or limitation of the invention.

Referring to FIG. 2, the method 200 comprises, at block 202, implementing a platform. The platform can be implemented using a cloud infrastructure running on a physical infrastructure. At block 204, the method further comprises configuring the platform to analyze feedback from a plurality of users 130, wherein the analyzing comprises gathering data from the plurality of users 130, processing the data to derive at least one trend from the data, and formatting a presentation of the data to enumerate the at least one trend.

The method further comprises, at block 206, configuring the platform to transmit the feedback, including results of the analyzing comprising the presentation of the data, to at least one of a business unit 102 and an experiential unit 104 in real-time, and, at block 208, configuring the platform to manage the feedback from each of a plurality of interfaces (e.g., interfaces 121-125) through which the plurality of users 130 provide the data. The method further comprises, at block 210, configuring the platform to receive from at least one of the business unit 102 and the experiential unit 104 a real-time response to the feedback to be transmitted to the one or more users 130. The presentation of the data may comprise at least one dashboard based on the results of the analyzing.

The feedback may comprise a response to a survey, and the method may further comprise configuring the platform to analyze success of the survey. The survey may be created by a business unit 102 or an experiential unit 104, and the method may further comprise configuring the platform to implement a workflow to obtain approval from the experiential unit 104 or the business unit 102 for questions in the survey. The approval can come from the unit that did not create the survey.

The method may further comprise configuring the platform to automatically obtain questions for the survey from a knowledge base based on at least one of a service offering, a product line, a target customer base, and a survey structure.

Figure 3:
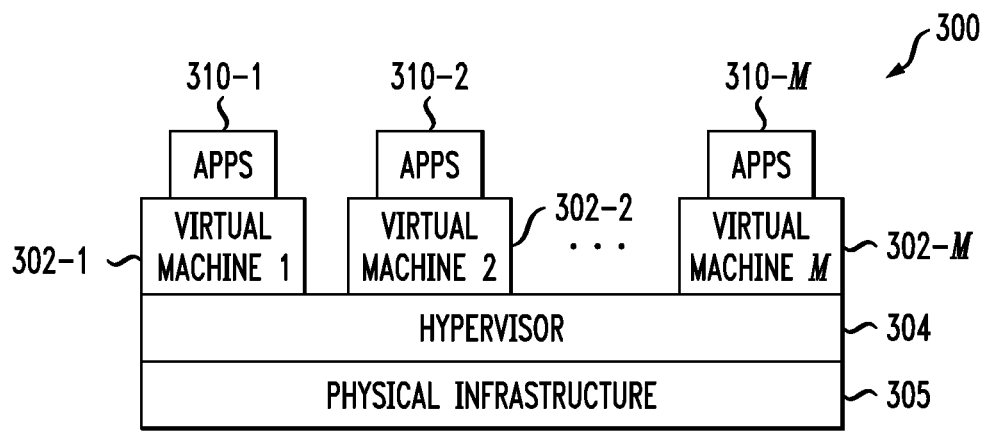
FIGS. 3 and 4 show examples of processing platforms that may be utilized to implement at least a portion of the system of FIG. 1.

The real-time multi-channel feedback system 110 of FIG. 1 may comprise software products including one or more application programs running on a cloud infrastructure, such as, for example, the cloud infrastructure 300 shown in FIG. 3.

As shown in FIG. 3, the cloud infrastructure 300 comprises virtual machines (VMs) 302-1, 302-2, . . . 302-M implemented using a hypervisor 304. The hypervisor 304, as mentioned above, is an example of what is more generally referred to herein as "virtualization infrastructure." The hypervisor 304 runs on physical infrastructure 305 (e.g., such as may include CPUs and/or storage devices). The cloud infrastructure 300 further comprises sets of applications 310-1, 310-2, . . . 310-M running on respective ones of the virtual machines 302-1, 302-2, . . . 302-M (utilizing associated logical units (LUNs) under the control of the hypervisor 304. The cloud infrastructure 300 can include, for example, CLOUD FOUNDRY® open source cloud computing platform as a service (PaaS), available from Pivotal Software, Inc. of Palo Alto, Calif.

Although only a single hypervisor 304 is shown in the example of FIG. 3, a given embodiment of cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. Virtualization is implemented by the hypervisor 304 which, as shown in FIG. 3, is directly inserted on top of the computer hardware in order to allocate hardware resources of the physical computer (physical infrastructure 305) dynamically and transparently. The hypervisor 304 affords the ability for multiple operating systems to run concurrently on a single physical computer and share hardware resources with each other. The hypervisor 304 thus also manages disk I/O scheduling associated with the workloads performed by each virtual machine.

An example of a commercially available hypervisor platform that may be used to implement portions of the cloud infrastructure 300 in one or more embodiments of the invention is the VMware® vSphere® which may have an associated virtual infrastructure management system such as the VMware® vCenter™. The underlying physical infrastructure 305 may comprise one or more distributed processing platforms that include storage products such as VNX® and Symmetrix® VMAX, both commercially available from EMC Corporation of Hopkinton, Mass. A variety of other storage products may be utilized to implement at least a portion of the cloud infrastructure 300.

Figure 4:
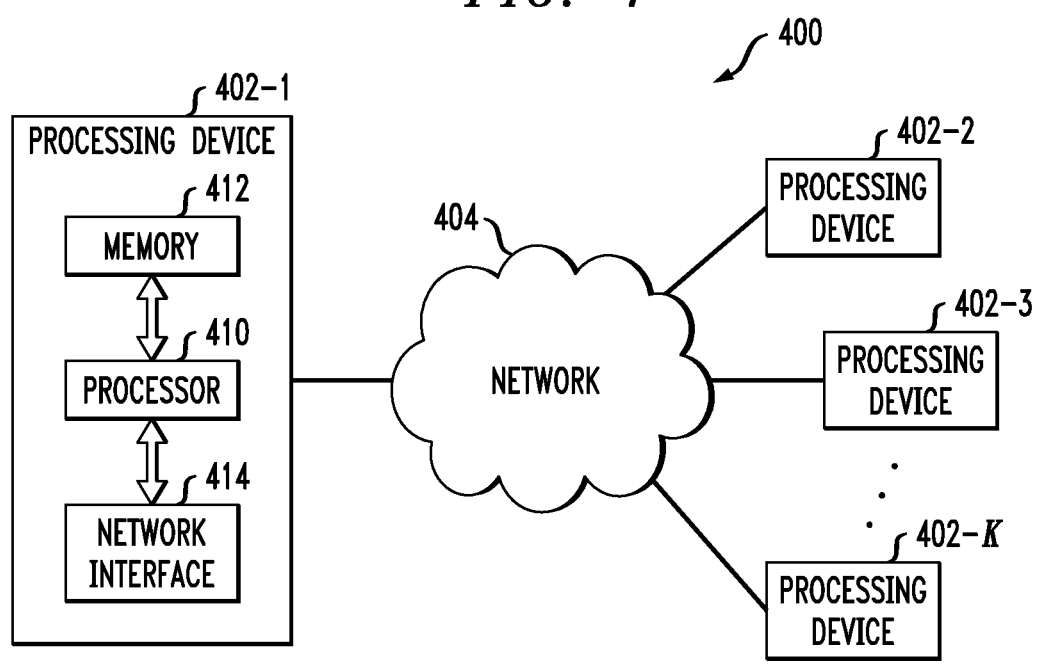

An example of a processing platform on which the cloud infrastructure 300 and/or the real-time multi-channel feedback system 110 of FIG. 1 may be implemented is processing platform 400 shown in FIG. 4. The processing platform 400 in this embodiment comprises at least a portion of the system 100 and includes a plurality of processing devices denoted 402-1, 402-2, 402-3, . . . 402-K, which communicate with one another over a network 404. One or more of the elements of system 110 may therefore each run on one or more computers or other processing platform elements, each of which may be viewed as an example of what is more generally referred to herein as a "processing device." As illustrated in FIG. 4, such a device generally comprises at least one processor 410 and an associated memory 412, and implements one or more functional modules for controlling certain features of system 110. Again, multiple elements or modules may be implemented by a single processing device in a given embodiment.

The processing device 402-1 in the processing platform 400 comprises a processor 410 coupled to a memory 412. The processor 410 may comprise a microprocessor, a microcontroller, an application-specific integrated circuit (ASIC), a field programmable gate array (FPGA) or other type of processing circuitry, as well as portions or combinations of such circuitry elements.

Components of a computing system as disclosed herein can be implemented at least in part in the form of one or more software programs stored in memory and executed by a processor of a processing device such as processor 410. Memory 412 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 412 may comprise electronic memory such as random access memory (RAM), read-only memory (ROM) or other types of memory, in any combination. The one or more software programs when executed by a processing device such as the processing device 402-1 causes the device to perform functions associated with one or more of the elements of system 110. One skilled in the art would be readily able to implement such software given the teachings provided herein. Other examples of processor-readable storage media embodying embodiments of the invention may include, for example, optical or magnetic disks.

Processing device 402-1 also includes network interface circuitry 414, which is used to interface the server with the network 404 and other system components. Such circuitry may comprise conventional transceivers of a type well known in the art.

The other processing devices 402 of the processing platform 400 are assumed to be configured in a manner similar to that shown for processing device 402-1 in the figure.

The processing platform 400 shown in FIG. 4 may comprise additional known components such as batch processing systems, parallel processing systems, physical machines, virtual machines, virtual switches, storage volumes, logical units, etc. Again, the particular processing platform shown in FIG. 4 is presented by way of example only, and system 110 of FIG. 1 may include additional or alternative processing platforms, as well as numerous distinct processing platforms in any combination.

Also, numerous other arrangements of servers, computers, storage devices or other components are possible in system 110. Such components can communicate with other elements of the system 110 over any type of network, such as a wide area network (WAN), a local area network (LAN), a satellite network, a telephone or cable network, a storage network (e.g., FC), a converged network (e.g., FCoE or Infiniband) or various portions or combinations of these and other types of networks.

Advantageously, in a non-limiting example, the embodiments of the present invention provide techniques for providing a single integrated feedback system for customers, wherein the feedback system is automated and operates in real-time over multiple channels. The embodiments of the present invention permit customers to be engaged in real-time, from multiple locations and via multiple devices. The embodiments of the present invention, for example, use automation to improve productivity, use analytics to derive improved customer insights, and use online dashboards for measurements, so that businesses can better know their customers and provide customers with an improved customer experience.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A system comprising:
a memory and a processor operatively coupled to the memory;
wherein the processor is configured for:
analyzing feedback from a plurality of users, wherein the analyzing comprises:
gathering data from the plurality of users;
processing the data to derive at least one trend from the data, wherein the processing comprises performing parallel structured query language processing, running analytical queries and mixed query workloads in parallel environments;
formatting a presentation of the data to enumerate the at least one trend; and
writing the data to a data store;
transmitting the feedback comprising results of the analyzing comprising the presentation of the data, to at least one of a business unit and an experiential unit in real-time, wherein the business unit and the experiential unit are communicatively coupled to a centralized portal through which the feedback is transmitted, and have defined access to the centralized portal;
managing the feedback from each of a plurality of interfaces through which the plurality of users provide the data;
wherein at least one of the plurality interfaces comprises an input component on a graphical user interface;
wherein the feedback further comprises information inputted from a user of the plurality of users via the input component during use of a product;
wherein the centralized portal comprises a set of tools comprising a markup language, a language describing presentation of a document written in the markup language, and a scripting language for providing dynamic control of the document written in the markup language, the set of tools being used for configuring the centralized portal: (i) to generate a dashboard visualization for at least one of the business unit and the experiential unit, the dashboard visualization comprising the results of the analyzing comprising instant views of trend analysis of at least one of real-time customer behavior, real-time customer responses and real-time customer requests; (ii) to process and transmit the feedback comprising the inputted information to at least one of the business unit and the experiential unit as a part of the real-time presentation of the data in the dashboard visualization; (iii) to process and transmit to the user from at least one of the business unit and the experiential unit a real-time response to the feedback comprising the inputted information; and (iv) to receive and process instructions outlining access to the system for at least one of the business unit, the experiential unit and the plurality of users;
wherein:
the feedback further comprises a response to a survey; and
the processor is further configured for:
training a learning algorithm as to which questions for the survey are appropriate for at least one of a plurality of factors, wherein the training is based on acceptance or rejection of the questions for the survey by at least one of the business unit and the experiential unit provided via the centralized portal and determined during an automated workflow implemented to obtain approval for the questions for the survey;
wherein the automated workflow is implemented by a workflow management engine configured to define and apply roles of the business unit, the experiential unit and groups within the business and experiential units in connection with the approval, authoring and review of the questions for the survey;

automatically providing questions for the survey to the plurality of users based on the trained learning algorithm, wherein the plurality of factors comprise a service offering, a product line, a target customer base, and a survey structure;

determining two or more of the plurality of the interfaces on which the survey is to be run;

automatically generating a plurality of different survey structures for the survey based on the determination of the two or more interfaces, the plurality of different survey structures respectively corresponding to the two or more interfaces of the plurality of interfaces;

pushing the plurality of different survey structures to their corresponding ones of the two or more interfaces; and translating the data from the plurality of users to a structured form to enable the analyzing to be performed on the data, irrespective of an interface of the plurality of interfaces through which the feedback is collected;

wherein at least another one of the plurality of interfaces providing the feedback comprises streaming input from one or more social media applications.

2. The system of claim 1, wherein the plurality of interfaces further comprise at least one of a kiosk device, an e-mail application, a mobile device and a desktop URL.

3. The system of claim 1, wherein the processor is further configured for receiving from at least one of the business unit and the experiential unit the real-time response to the feedback to be transmitted to the user and other ones of the plurality of users.

4. The system of claim 1, wherein the processor is further configured for storing at least one of the feedback from plurality of users and the results of the analyzing.

5. The system of claim 1, further comprising software products including one or more application programs running on a virtualization infrastructure.

6. The system of claim 1, further comprising software products including one or more application programs running on a cloud infrastructure.

7. The system of claim 1, further comprising software products including one or more application programs running on a micro services architecture.

8. A method comprising the steps of:
analyzing feedback from a plurality of users, wherein the analyzing comprises:
  gathering data from the plurality of users;
  processing the data to derive at least one trend from the data, wherein the processing comprises performing parallel structured query language processing, running analytical queries and mixed query workloads in parallel environments;
  formatting a presentation of the data to enumerate the at least one trend; and
  writing the data to a data store;
transmitting the feedback comprising results of the analyzing comprising the presentation of the data, to at least one of a business unit and an experiential unit in real-time, wherein the business unit and the experiential unit are communicatively coupled to a centralized portal through which the feedback is transmitted, and have defined access to the centralized portal;
managing the feedback from each of a plurality of interfaces through which the plurality of users provide the data;

wherein at least one of the plurality interfaces comprises an input component on a graphical user interface;

wherein the feedback further comprises information inputted from a user of the plurality of users via the input component during use of a product;

wherein the centralized portal comprises a set of tools comprising a markup language, a language describing presentation of a document written in the markup language, and a scripting language for providing dynamic control of the document written in the markup language, the set of tools being used for configuring the centralized portal: (i) to generate a dashboard visualization for at least one of the business unit and the experiential unit, the dashboard visualization comprising the results of the analyzing comprising instant views of trend analysis of at least one of real-time customer behavior, real-time customer responses and real-time customer requests; (ii) to process and transmit the feedback comprising the inputted information to at least one of the business unit and the experiential unit as a part of the real-time presentation of the data in the dashboard visualization; (iii) to process and transmit to the user from at least one of the business unit and the experiential unit a real-time response to the feedback comprising the inputted information; and (iv) to receive and process instructions outlining access to the system for at least one of the business unit, the experiential unit and the plurality of users;

wherein the feedback further comprises a response to a survey;

training a learning algorithm as to which questions for the survey are appropriate for at least one of a plurality of factors, wherein the training is based on acceptance or rejection of the questions for the survey by at least one of the business unit and the experiential unit provided via the centralized portal and determined during an automated workflow implemented to obtain approval for the questions for the survey;
  wherein the automated workflow is implemented by a workflow management engine configured to define and apply roles of the business unit, the experiential unit and groups within the business and experiential units in connection with the approval, authoring and review of the questions for the survey;

automatically providing questions for the survey to the plurality of users based on the trained learning algorithm, wherein the plurality of factors comprise a service offering, a product line, a target customer base, and a survey structure;

determining two or more of the plurality of the interfaces on which the survey is to be run;

automatically generating a plurality of different survey structures for the survey based on the determination of the two or more interfaces, the plurality of different survey structures respectively corresponding to the two or more interfaces of the plurality of interfaces;

pushing the plurality of different survey structures to their corresponding ones of the two or more interfaces; and translating the data from the plurality of users to a structured form to enable the analyzing to be performed on the data, irrespective of an interface of the plurality of interfaces through which the feedback is collected;

wherein at least another one of the plurality of interfaces providing the feedback comprises streaming input from one or more social media applications; and wherein the steps of the method are executed on a platform via at least one processor coupled to a memory.

9. The method of claim 8, wherein the plurality of interfaces further comprise at least one of a kiosk device, an e-mail application, a mobile device and a desktop URL.

10. The method of claim 8, further comprising receiving from at least one of the business unit and the experiential unit the real-time response to the feedback to be transmitted to the user and other ones of the plurality of users.

11. The method of claim 8, further comprising storing at least one of the feedback from plurality of users and the results of the analyzing.

12. A method comprising:
implementing a platform via at least one processing device having a processor coupled to a memory; and
executing, by the at least one processing device of the platform, the steps of:
analyzing feedback from a plurality of users, wherein the analyzing comprises:
gathering data from the plurality of users;
processing the data to derive at least one trend from the data, wherein the processing comprises performing parallel structured query language processing, running analytical queries and mixed query workloads in parallel environments;
formatting a presentation of the data to enumerate the at least one trend; and
writing the data to a data store;
transmitting the feedback comprising results of the analyzing comprising the presentation of the data, to at least one of a business unit and an experiential unit in real-time, wherein the business unit and the experiential unit are communicatively coupled to a centralized portal through which the feedback is transmitted, and have defined access to the centralized portal;
managing the feedback from each of a plurality of interfaces through which the plurality of users provide the data;
wherein at least one of the plurality interfaces comprises an input component on a graphical user interface;
wherein the feedback further comprises information inputted from a user of the plurality of users via the input component during use of a product;
wherein the centralized portal comprises a set of tools comprising a markup language, a language describing presentation of a document written in the markup language, and a scripting language for providing dynamic control of the document written in the markup language, the set of tools being used for configuring the centralized portal: (i) to generate a dashboard visualization for at least one of the business unit and the experiential unit, the dashboard visualization comprising the results of the analyzing comprising instant views of trend analysis of at least one of real-time customer behavior, real-time customer responses and real-time customer requests, (ii) to process and transmit the feedback comprising the inputted information to at least one of the business unit and the experiential unit as a part of the real-time presentation of the data in the dashboard visualization; (iii) to process and transmit to the user from at least one of the business unit and the experiential unit a real-time response to the feedback comprising the inputted information; and (iv) to receive and process instructions outlining access to the system for at least one of the business unit, the experiential unit and the plurality of users;
wherein:
the feedback further comprises a response to a survey; and
the method further comprises executing, by the at least one processing device of the platform, the step of:
training a learning algorithm as to which questions for the survey are appropriate for at least one of a plurality of factors, wherein the training is based on acceptance or rejection of the questions for the survey by at least one of the business unit and the experiential unit provided via the centralized portal and determined during an automated workflow implemented to obtain approval for the questions for the survey;
wherein the automated workflow is implemented by a workflow management engine configured to define and apply roles of the business unit, the experiential unit and groups within the business and experiential units in connection with the approval, authoring and review of the questions for the survey;
automatically providing questions for the survey to the plurality of users based on the trained learning algorithm, wherein the plurality of factors comprise a service offering, a product line, a target customer base, and a survey structure;
determining two or more of the plurality of the interfaces on which the survey is to be run;
automatically generating a plurality of different survey structures for the survey based on the determination of the two or more interfaces, the plurality of different survey structures respectively corresponding to the two or more interfaces of the plurality of interfaces;
pushing the plurality of different survey structures to theft corresponding ones of the two or more interfaces; and
translating the data from the plurality of users to a structured form to enable the analyzing to be performed on the data, irrespective of an interface of the plurality of interfaces through which the feedback is collected;
wherein at least another one of the plurality of interfaces providing the feedback comprises streaming input from one or more social media applications.

13. The method of claim 12, wherein the method further comprises executing, by the at least one processing device of the platform, the step of receiving from at least one of the business unit and the experiential unit the real-time response to the feedback to be transmitted to the user and other ones of the plurality of users.

14. The method of claim 12, wherein the plurality of interfaces further comprise at least one of a kiosk device, an e-mail application, a mobile device and a desktop URL.

15. The method of claim 12, wherein the method further comprises executing, by the at least one processing device of the platform, the step of storing at least one of the feedback from plurality of users and the results of the analyzing.

16. An article of manufacture comprising a processor-readable storage medium having encoded therein executable code of one or more software programs, wherein the one or more software programs when executed by a processing device implement the steps of:

analyzing feedback from a plurality of users, wherein the analyzing comprises:
 gathering data from the plurality of users;
 processing the data to derive at least one trend from the data, wherein the processing comprises performing parallel structured query language processing, running analytical queries and mixed query workloads in parallel environments;
 formatting a presentation of the data to enumerate the at least one trend; and
 writing the data to a data store;
transmitting the feedback comprising results of the analyzing comprising the presentation of the data, to at least one of a business unit and an experiential unit in real-time, wherein the business unit and the experiential unit are communicatively coupled to a centralized portal through which the feedback is transmitted, and have defined access to the centralized portal;
managing the feedback from each of a plurality of interfaces through which the plurality of users provide the data;
wherein at least one of the plurality interfaces comprises an input component on a graphical user interface;
wherein the feedback further comprises information inputted from a user of the plurality of users via the input component during use of a product;
wherein the centralized portal comprises a set of tools comprising a markup language, a language describing presentation of a document written in the markup language, and a scripting language for providing dynamic control of the document written in the markup language, the set of tools being used for configuring the centralized portal: (i) to generate a dashboard visualization for at least one of the business unit and the experiential unit, the dashboard visualization comprising the results of the analyzing comprising instant views of trend analysis of at least one of real-time customer behavior, real-time customer responses and real-time customer requests; (ii) to process and transmit the feedback comprising the inputted information to at least one of the business unit and the experiential unit as a part of the real-time presentation of the data in the dashboard visualization; (iii) to process and transmit to the user from at least one of the business unit and the experiential unit a real-time response to the feedback comprising the inputted information; and (iv) to receive and process instructions outlining access to the system for at least one of the business unit, the experiential unit and the plurality of users;
wherein:
the feedback further comprises a response to a survey; and
the one or more software programs when executed by the processing device further implement the steps of:
 training a learning algorithm as to which questions for the survey are appropriate for at least one of a plurality of factors, wherein the training is based on acceptance or rejection of the questions for the survey by at least one of the business unit and the experiential unit provided via the centralized portal and determined during an automated workflow implemented to obtain approval for the questions for the survey;
  wherein the automated workflow is implemented by a workflow management engine configured to define and apply roles of the business unit, the experiential unit and groups within the business and experiential units in connection with the approval, authoring and review of the questions for the survey;
 automatically providing questions for the survey to the plurality of users based on the trained learning algorithm, wherein the plurality of factors comprise a service offering, a product line, a target customer base, and a survey structure;
 determining two or more of the plurality of the interfaces on which the survey is to be run;
 automatically generating a plurality of different survey structures for the survey based on the determination of the two or more interfaces, the plurality of different survey structures respectively corresponding to the two or more interfaces of the plurality of interfaces;
 pushing the plurality of different survey structures to their corresponding ones of the two or more interfaces; and
 translating the data from the plurality of users to a structured form to enable the analyzing to be performed on the data, irrespective of an interface of the plurality of interfaces through which the feedback is collected;
  wherein at least another one of the plurality of interfaces providing the feedback comprises streaming input from one or more social media applications.

17. The article of manufacture of claim 16, wherein the plurality of interfaces further comprise at least one of a kiosk device, an e-mail application, a mobile device and a desktop URL.

18. The article of manufacture of claim 16, wherein the one or more software programs further implement the step of receiving from at least one of the business unit and the experiential unit the real-time response to the feedback to be transmitted to the user and other ones of the plurality of users.

19. The article of manufacture of claim 16, wherein the one or more software programs further implement the step of storing at least one of the feedback from plurality of users and the results of the analyzing.

20. The article of manufacture of claim 16, further comprising software products including one or more application programs running on a virtualization infrastructure.

* * * * *